July 10, 1956 H. W. BOESSENKOOL ET AL 2,753,623
SOLID PHASE BONDING OF METALS
Filed Jan. 5, 1951 10 Sheets-Sheet 1

Helmich W. Boessenkool,
George Durst,
Sidney Siegel,
  Inventors.
Koenig and Pope,
  Attorneys.

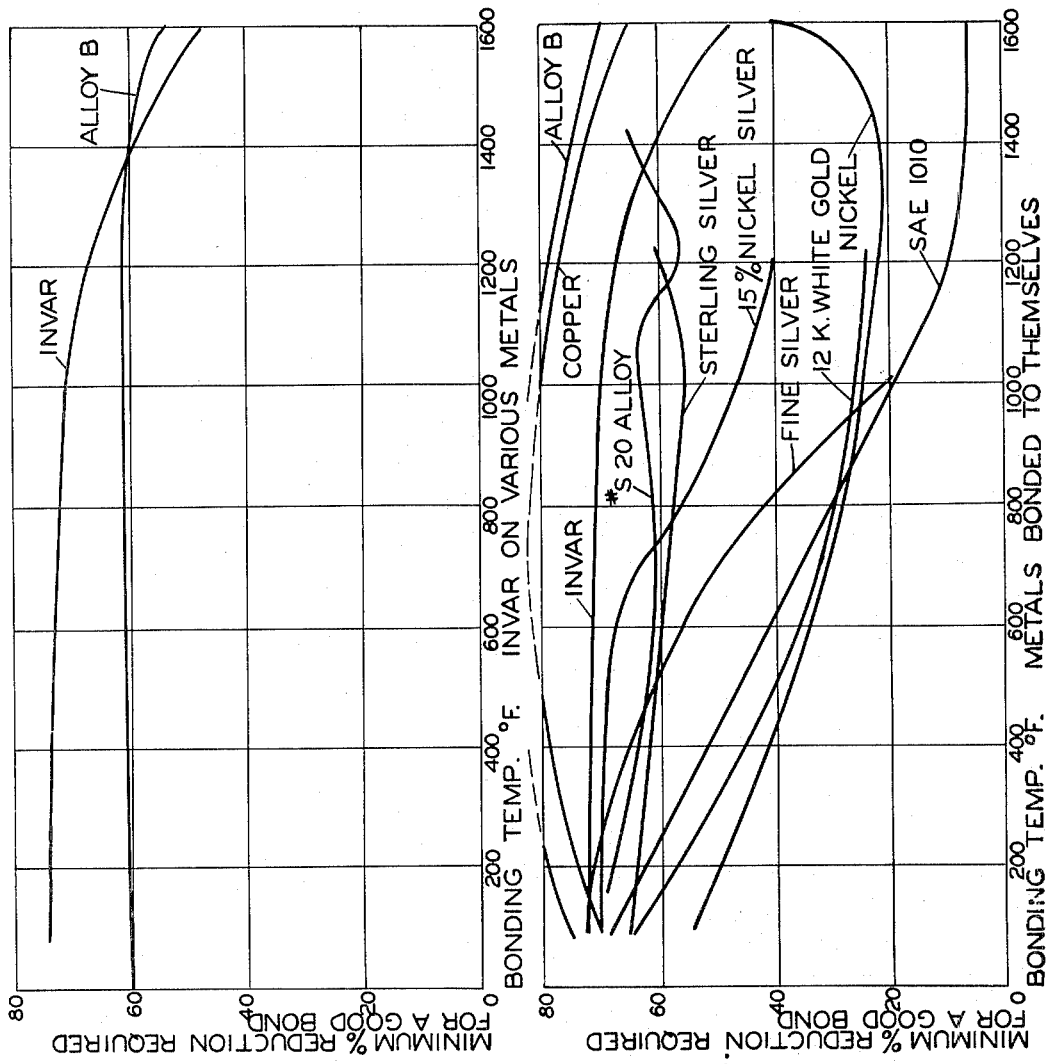

United States Patent Office 2,753,623
Patented July 10, 1956

2,753,623

SOLID PHASE BONDING OF METALS

Helmich W. Boessenkool, South Easton, and George Durst and Sidney Siegel, Attleboro, Mass., assignors to Metals & Controls Corporation, Attleboro, Mass., a corporation of Massachusetts Application January 5, 1951, Serial No. 204,646

6 Claims. (Cl. 29—497.5)

This invention relates to the solid-phase bonding of metals, i. e., to the bonding of metals without the formation of any liquid phase material at the interfaces of the metals being bonded, and more particularly to the bonding of metals to provide multi-layer composite metals wherein any one layer is permanently bonded over its interfacial area to the contiguous interfacial area of an adjacent layer. The term "metals" is used herein in its broad sense including alloys.

The invention has particular use in the continuous solid phase bonding of metals where the component metals have thicknesses of the order of magnitude of 0.5 inch or less and can, therefore, be readily handled in coil form.

Among the several objects of the invention may be noted the provision of methods for solid-phase bonding of metals which are not readily bondable by methods heretofore known in the art; the provision of methods for bonding metals including a single deformation operation which places the as-bonded metals in their final thickness; the provision of methods for bonding metals, which are readily adaptable to the continuous bonding of long lengths of commercially available strips of metal; the provision of methods for bonding metals having widely different yield points in a simple operation whereby the ratio of thicknesses of the metals remains substantially the same throughout the process; the provision of methods for solid-phase bonding of metals wherein the factors of temperature and deformation are so related as to permit, for a given deformation means, the bonding of metals of thicknesses hitherto thought to be unbondable by said means; the provision of methods for rapidly and continuously solid-phase bonding dissimilar metals wherein the cost of the bonding operation is relatively low; and the provision of methods of the class described which are economical and which use conventional and simple apparatus. Other features will be in part apparent and in part pointed out hereinafter.

We have discovered methods for solid-phase bonding of metals to form multi-layer composite stock which open up a new field of such bonding within a new temperature range which in many instances was hitherto not contemplated as suitable for bonding, and using techniques the combination of which produce bonding results of surprising and unexpected kind. This temperature range is an elevated temperature range, extending from just above the minimum recrystallization temperature of the metal having the lowest recrystallization temperature on up to the highest temperature at which the metals may be deformed without any pulling apart or any formation of brittle compounds or liquid phase material at the interface of the metals being bonded, the temperature being measured just as the metals enter the deforming means. By following the principles of our invention, as hereinafter to be particularly described, it is possible to solid-phase bond layers of any two malleable metals (including layers of the same metal). The invention makes it possible readily and economically to bond metals which are not adapted to be bonded readily by any known method, using conventional equipment. In carrying out the invention, it is possible to bond the surfaces of metals in commercially available shapes, even of metals with widely varying yield points, with accurate control over the relative thicknesses of the layers of metals as well as of the total thickness of the end product.

Underlying our new techniques is our discovery that (1) the simultaneous pressing together and increasing of the interfacial surfaces of two layers of metals results in an incipient bond between them whose strength is a function of the temperature of the metals at the interface and the amount of deformation which they undergo and (2) that the area of the initial or incipient bond (and as a result, the overall bond strength) can be materially increased by a heat treatment to be hereinafter described.

We have also discovered that there is, at every temperature, a minimum amount of deformation required to result in an incipient bond which is amenable to subsequent improvement by said heating. In many instances the amount of deformation necessary to result in an incipient bond (which can be later transformed into a commercially satisfactory bond) is entirely unpredictable and unexpected and contravenes certain present metallurgical teachings. This will be explained in greater detail hereinafter.

We refer to this incipient bond as a "nucleal" bond and to the improvement by heating as a "sintering" operation. In other words, the bonding of metals, according to our invention is divided into two phases, the first being the pressing together of the metals at such elevated temperature and with such a percentage of deformation as to form a nucleal bond and the second being the sintering of the nucleal-bonded intermediate product to increase the bond strength.

Knowing the temperature versus percentage-of-deformation characteristic for a given combination of metals necessary to obtain a commercially satisfactory bond, we can select a particular correlation of temperature and percentage of deformation suitable and convenient for accomplishing bonding on available metal working equipment consistent with the starting dimensions of the metals and the final dimension required.

In applying our invention to the production of composite strip or sheet we have found it convenient to obtain simultaneous squeezing and interfacial area-increase through the use of a conventional rolling mill, but other modes of deformation such as drawing, extrusion, upsetting, swaging, etc., can be used.

Thus, in general, our method of bonding metals to provide multi-layer composite stock comprises the heating of at least one of the metals without appreciable oxidation to an elevated temperature having as its upper limit either the temperautre at which said metal would pull apart when worked (this being hereinafter referred to as the "hot-short" temperature of the metal), or the temperature at which brittle compounds or liquid phase material would form at the interface, whichever is lower. The lower limit of this temperature is just above the cold-working temperature, i. e., the minimum recrystallization temperature of the metal having the lower recrystallization temperature.

It will be understood that the surfaces of the metals which become the interfacial surfaces have been cleaned prior to heating. Where the metals are heated in protective atmosphere to temperatures above approximately 500° F., this cleaning need remove only gross contaminants; where the metals are not heated above this temperature, special surface preparation which removes not only gross contaminants but also thin films which are not normally considered objectionable but which act as barriers to bonding at these low temperatures must be used. Such films might, for example, consist of hydrated oxides, organic matter such as oil, lint, etc., adsorbed or chemisorbed layers of liquids and gases. A preferred way of removing such barrier films is by the use of abrasion techniques, such as wire brushing at such speed and pressure that considerable surface heat is developed at the same time as the surface layers of the metal are removed. Another method is to clean so as to remove gross contaminants by pickling followed by heating in protective atmosphere so as to drive off residual moisture films. Thereafter barrier films are prevented from forming prior to the deformation operation. It will be seen that where the heating for bonding is at a high enough temperature, this step is already included in the process.

The metals are then squeezed together with concurrent interfacial area increase, the interfacial area being protected from appreciable oxidation up to the moment of deformation. Deformation is effected with such a percentage of reduction in the thickness of the metals as correlated with the elevated temperature, as to effect nucleal bonding at the interface, the nucleal bond being such that the metals are bonded only over such a portion of the interfacial area and with such bond distribution that the metals are held together with at least enough strength so that they may be handled without coming apart, but usually with insufficient strength to prevent their being intentionally peeled apart at the interface. The percentage of reduction is so selected in accordance with the elevated temperature as to effect only such nucleal bonding. Then the resultant nucleal bonded composite stock is sintered at such a temperature and for such a length of time as to effect an increase in the overall area of the interfacial bond and thus to increase the overall bond strength and establish a strong and permanent bond.

The invention accordingly comprises the steps and sequence of steps, and features of manipulation, which will be exemplified in the methods hereinafter described, and the scope of the application of which will be indicated in the following claims.

To illustrate the principle of our invention we now describe in detail the application of the invention to the production of composite sheet and strip using a rolling mill as the deformation means.

In the accompanying drawings, in which several of various possible embodiments of the invention are shown, Fig. 1 is a diagrammatic elevation of an apparatus with which the invention may be carried out;

Figs. 9 to 22 are charts on which we have plotted characteristic curves illustrating the relationship between bonding temperature and minimum percentages of reduction for various combinations of metals.

Similar reference characters indicate corresponding parts throughout the several views of the drawings.

Figure 1:
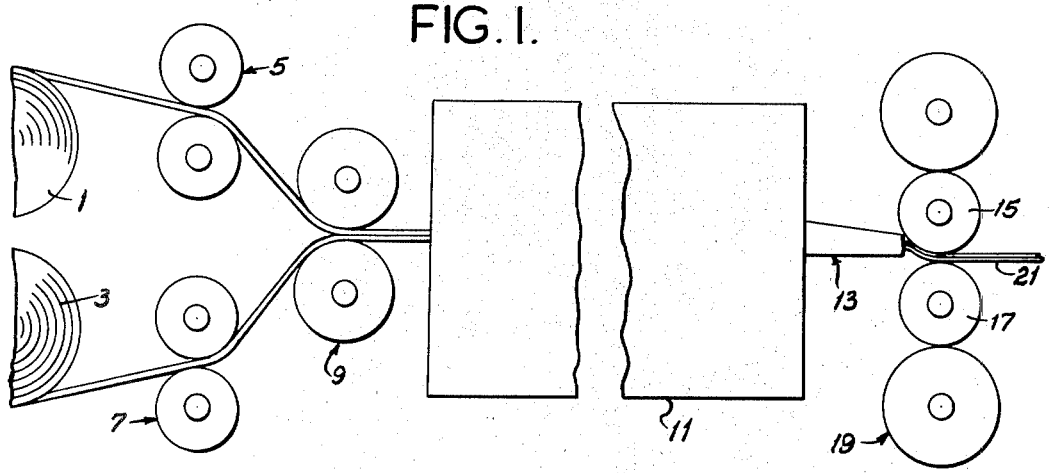

Referring to the drawings, there is diagrammatically shown in Fig. 1 an apparatus we have used successfully to practice this invention. At 1 and 3 are shown coils of two metals to be bonded together. The long strips of metal from coils 1 and 3 pass respectively through sets of pinch rolls indicated at 5 and 7, thence to a set of idler rolls 9 and into a heating furnace 11. The heated strips emerge from the furnace through a guide member 13 and, while heated, immediately pass through the rolls 15 and 17 of the rolling mill indicated generally by numeral 19, the two strips being squeezed together and nucleal-bonded into the one strip 21 by the action of the rolling mill.

Pinch rolls 5 and 7 are used to impart tension or a backward restraining force to the strips as they travel through the furnace and into the rolling mill. These pinch rolls are not necessary where the strips being bonded are relatively thick and consequently stiff. However, where the strips are thin, the pinch rolls are useful to assist guide 13 in its function. This will be explained later in greater detail. Furnace 11 may be any of the conventional furnaces in which the atmosphere may be controlled so as to inhibit oxide formation on the surfaces of the metals, and preferably also to reduce any oxides already formed. The use of a furnace of this type is also advantageous in that it also cleans the surfaces to be bonded together by burning off any organic dirt or refuse. In practice, the furnace we have used has been about 20 feet long.

Figure 2:
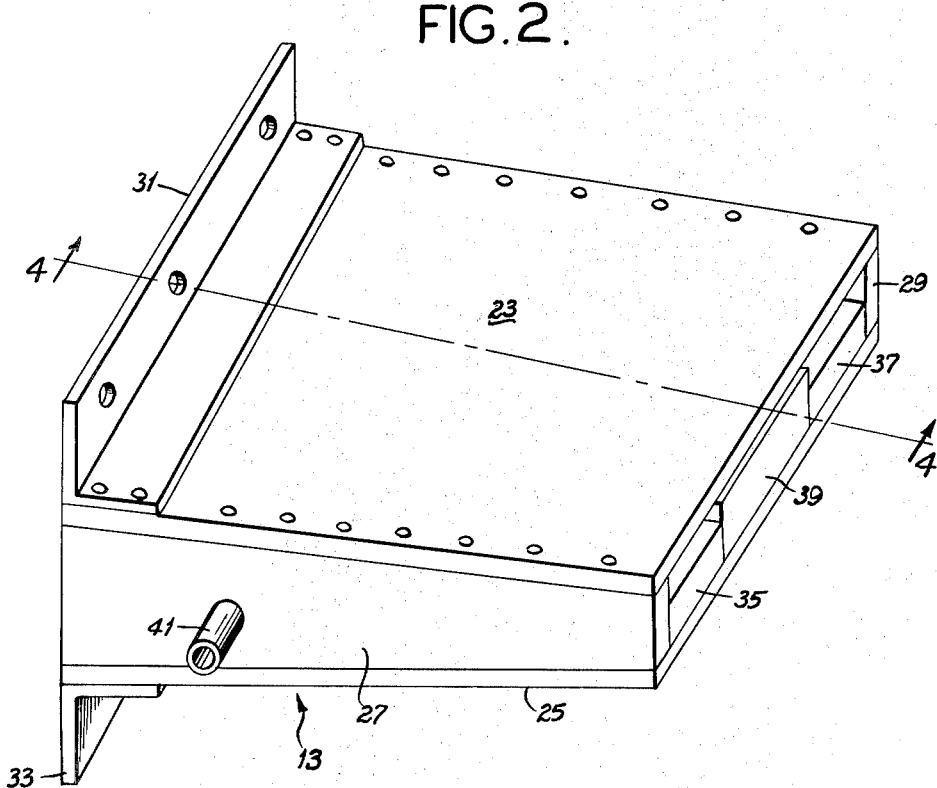
Fig. 2 is a perspective view of a guide of the apparatus.
Figure 3:
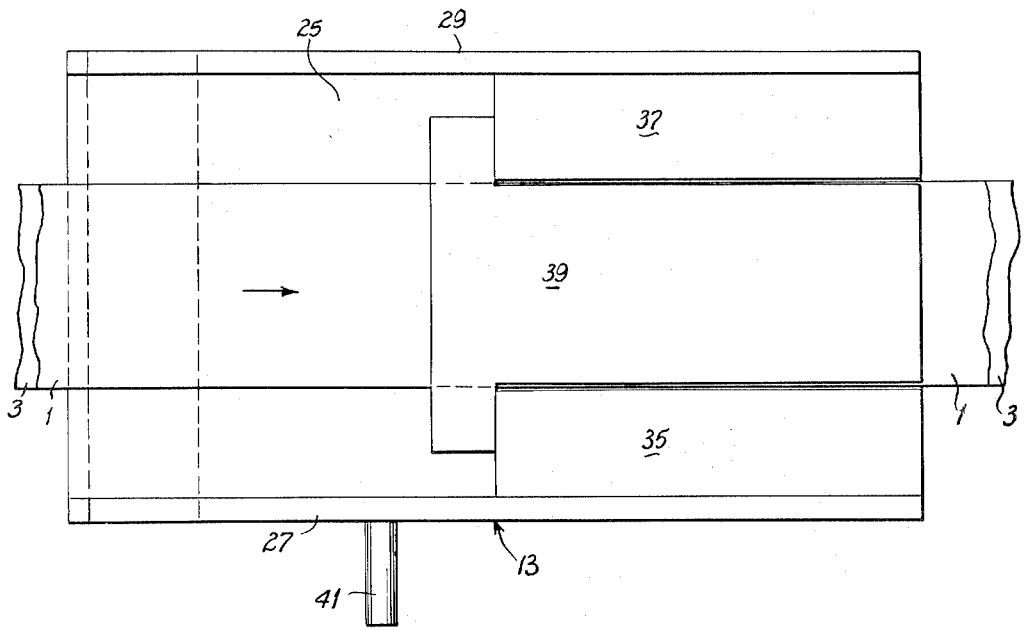
Fig. 3 is a plan view of the guide with a cover thereof removed.
Figure 4:
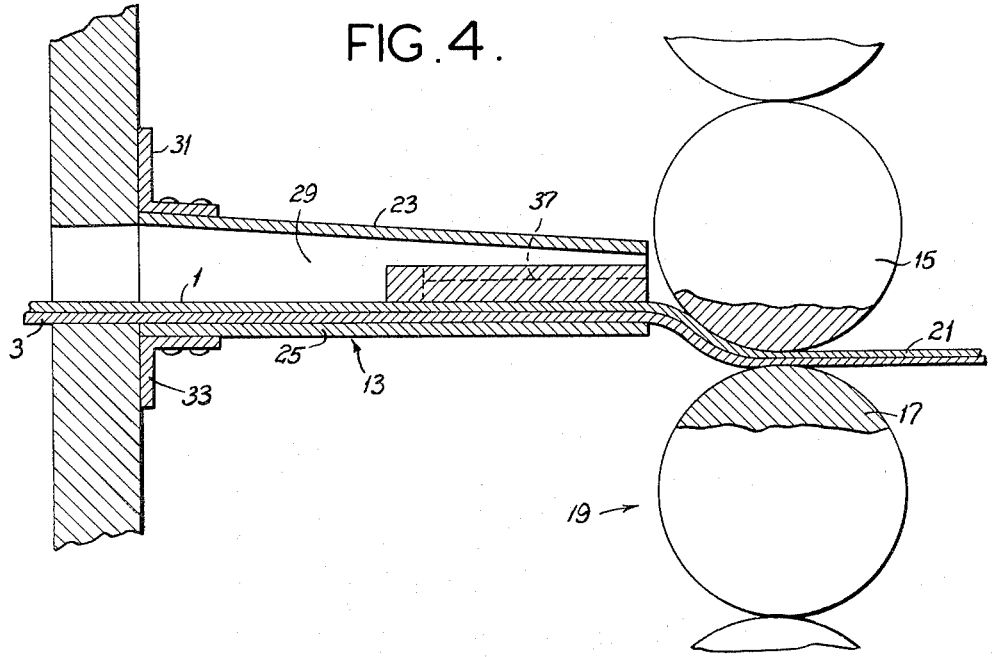
Fig. 4 is a vertical section taken on line 4—4 of Fig. 2.

Referring now to Figs. 2, 3, and 4, there is illustrated the guide 13 which is used at the exit end of furnace 11. The guide 13 comprises a top 23, bottom 25, sides 27 and 29, mounting flanges 31 and 33, fixed inside guide bars 35 and 37 and movable weight bar 39. The top 23 is removably attached to the sides 27 and 29 by screws or bolts which are shown only schematically, since the exact means of fastening is not important. Referring now to Figs. 3 and 4, the weight bar 39 is shown as being T-shaped in plan and lying between the side bars 35 and 37, with the head of the T in engagement with the inner or rearward ends of the side bars 35 and 37, to keep the weight member 39 from sliding forward out of the guide. The purpose of the T-shaped bar 39 is to assist in keeping thin stock from moving up the sides of the side bars 35 and 37 and thus getting out of register. If necessary, shim blocks may be placed between the top of member 39 and the under side of top 23 to assist member 39 in pressing down on the strips as they traverse the guide.

An important feature of the guide is that it conducts or encloses reducing atmosphere from the furnace up to the rolls of the rolling mill, and hence the stock to be bonded is in this atmosphere almost up to the very point of nucleal-bonding. If necessary, an additional inlet to the guide for reducing atmosphere may be provided. This is suggested by the inlet pipe 41. As a further precaution, jets of reducing gas may be directed against the edges of the strips to protect them from oxidation in the short distance between end of guide and mill.

The purpose of guide 13 is to keep the strips about to be bonded in alignment with each other. Because of the relatively large reductions given by the rolling mill, the strips have a decided tendency to slip sideways on each other, and guide 13 is designed to keep them registered.

Referring now to Fig. 4, an enlarged view is shown of the relationship of guide 13 to the rolls 15 and 17 of the rolling mill. The inner surface of the bottom 25 of the guide is positioned to be above the pass line of the rolls. This distance may be ½ to 1 inch, depending on the reduction being given and the type and thickness of the stock being rolled and the diameter of the rolls. The effect of so mounting guide 13 is to cause the metal strips to be forced against the bottom of the guide channel and then they are kept from riding up the sides of guide bars 35 and 37. In addition, the curvature imparted to the strips by having to bend downwardly to enter the mill helps to keep them in register.

The rolling mill may be any conventional mill capable of doing the work required for various metals. We have successfully used a 2-high mill with working roll diameter of 10 inches, and have governed the speed of the rolls so that, for example, the nucleal-bonded material emerges from the mill at a linear speed of about 12 feet per minute. We prefer, however, to use a 4-high mill with work rolls having a diameter of 3 to 7 inches. The stock speed emerging from the mill has been in the range from 5 to 25 feet per minute, but can be considerably increased if the furnace capacity permits.

The employment of pinch rolls 5 and 7 as back tension devices is useful where thin materials are being bonded. Thin materials, because of their lack of stiffness and transverse rigidity, tend to ride up the side walls of side bars 35 and 37. If back tension is put on these strips, however, the tension will aid in preventing this. It will be found that the tensioning devices should preferably be independently variable in order to govern the tension on each strip individually. This follows from the fact that a tension which one metal can take safely at the elevated temperature may be such as to break the other strip at the same temperature. Another reason for the desirability of independence of the tension regulation lies in the difference in the coefficient of expansion of the two metals, and the fact that the difference in hardness of the two metals can cause the softer metal to travel more slowly through the furnace toward the rolling mill.

For any particular combination of metals, the temperature of the furnace and the percentage of reduction imparted to the strips by the rolls of the rolling mill are so correlated that the strips are nucleal-bonded, with this bond being capable of being converted into a strong and permanent bond by a sintering operation to be described, the temperature of the metals entering the rolls being above the minimum temperature of recrystallization of the metal having the lowest temperature of recrystallization and below either the hot-short temperature of the metal having the lower hot-short temperature, or the temperature at which liquid phase material or brittle compounds would form, whichever is lower.

We point out that the temperature of the metals is measured just prior to the entrance of the metals between the rolls of the mill. The rolls are in all cases at a temperature greatly below the temperature of the metals, and therefore the rolls exert a quenching or chilling action on the material, the amount depending on the bulk and specific heat of the material being deformed. Because of this quenching action, there is usually a certain amount of strain-hardening of at least one of the component metals. This strain-hardening permits greater stresses to be induced at the interfacial surfaces for a given reduction and we believe it causes the formation of more nucleal bonds.

Figure 5:
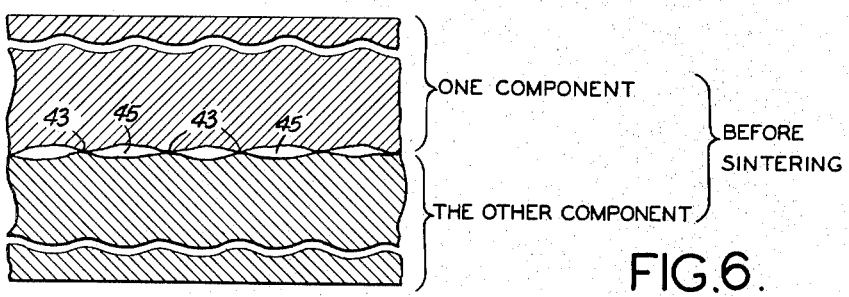
Fig. 5 is a fragmentary greatly enlarged cross section of the intermedaite nucleal-bonded composite stock.
Figure 6:
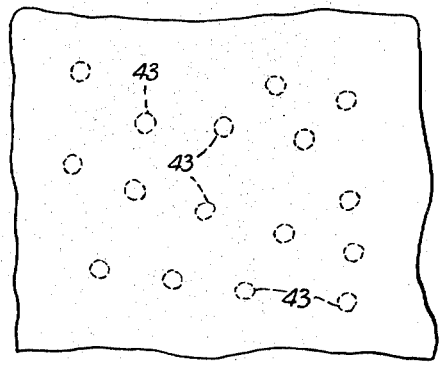
Fig. 6 is a plan view of Fig. 5.

We will now explain in some more detail what we mean by nucleal bond. According to our theory, a metallic bond exists by the interatomic force field surrounding metal atoms. In the case of our first formed, incipient or nucleal bond, the bond is not wholly continuous throughout the interfacial area, but exists because of the formation of numerous discrete bonded areas randomly distributed throughout the interfacial area. This is illustrated in Figs. 5 and 6, wherein we show schematically with great enlargement what we believe to be the appearance in cross-section and in plan view of nucleal-bonded layers. It will be seen that according to these illustrations, bond areas exist as indicated at 43 with in between unbonded space 45 of which the thickness is exceedingly small. We believe that this bond distribution results from the fact that, from an atomic viewpoint, the surfaces of the metals are quite rough rather than smooth, and, in being squeezed together come in contact only at isolated high points or areas rather than throughout their entire interfacial area. There is, no doubt, some plastic deformation and flattening of the high points under the pressure. Wherever the pressure engagement between flattened high points of the interfacial surfaces is such as to cause metal atoms to approach one another within the range of several atomic distances, then the inter-atomic forces of attraction cause them to adhere.

Also, due to the fact that the deformation is at an elevated temperature, a certain amount of bond area increase occurs as a result of increased atomic mobility at this temperature. It should be emphasized that the theory is based upon the assumption that the surfaces of the metals are sufficiently clean and free of bond-preventing contaminants, such as ash and carbonaceous substances which might result from the decomposition of organic materials, as to allow for true metal-to-metal contact over a sufficient area. Also, it is to be understood that brittle surface films, such as certain oxide films, which crack apart under the deformation, thus exposing metal surfaces, are not necessarily bond-preventing contaminants. In the elevated temperature deformation operation, the reduction of the metals results in extensive interfacial area increase, and we believe this area increase or stretching to be an important factor in the success of the method because (a) it has a tendency to pull relatively brittle oxide films apart and expose virgin metal surfaces which are receptive to bonding and (b) it causes shear stresses and other forces to be set up which assist in the formation of nucleal bonds. It is believed that, in some cases, the subsequent heat treatment diffuses away into the body of the metal any residual oxide dissociation products which may have been present at the interface.

We shall now explain, in somewhat more detail, what we mean by sintering.

Figure 7:
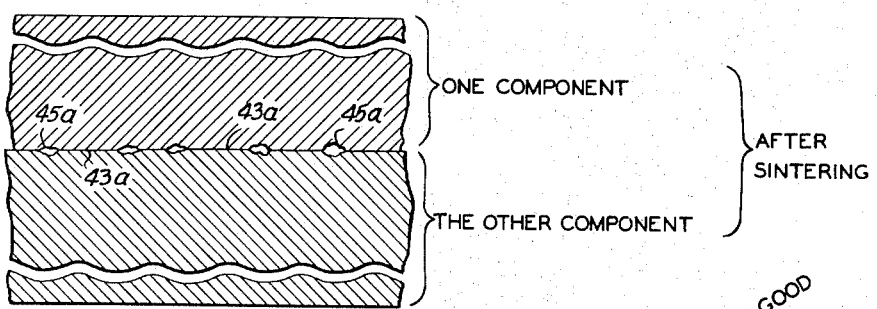
Fig. 7 is a view similar to Fig. 5 illustrating the finished product after sintering.

The composite nucleal-bonded stock is sintered to cause a growth of the interfacial nucleal bonds so as to increase the overall strength of the bond between the layers of metals. By "sintering" we mean heating the nucleal-bonded stock to such a temperature and for such a length of time as to effect such growth. The sintering operation, according to our theory, results in the conversion of the nucleal-bonded stock to the form shown in Fig. 7, in which it will be seen that bonded areas, indicated at 43a, have grown in size; and that the open space (indicated at 45a) has decreased in size and will have, in the ideal case, disappeared entirely, resulting in a perfect bond. We believe that the sintering temperature effects growth of bond areas because it increases atomic mobility and, in accordance with thermodynamic law, there is a migration of atoms into the open space at the interface in order to decrease the free surface energy. Preferably, sintering is effected at a temperature above the minimum recrystallization temperature of the metal having the lowest recrystallization temperature, but in any case below the temperature at which any brittle intermetallic compounds would form in any appreciable amount. Here it should be mentioned that sintering can sometimes be accomplished at temperatures below the recrystallization temperature of either metal, but in general the time required to effect sintering at these lower temperatures is considerably longer and in such case both metals remain in the work hardened condition.

The above theories are submitted as a possible explanation for the efficacy of the method of the invention. It is to be understood that we do not wish to be bound by the theories, as there may be other reasons for the bonding and sintering phenomena.

When we use a rolling mill to accomplish the deformation required to apply our invention we find that there exists for any particular combination of metals a definite relationship between the temperature and the minimum percentage of reduction necessary to achieve our purpose. This relationship determines first whether the metals will become nucleal-bonded; and second whether, assuming they have become so bonded, the nucleal bonds can be caused to grow into a strong permanent bond. In other words, for any particular combination of metals and for a specified temperature, there is some minimum percentage of reduction required in rolling to accomplish good bonding. For other means of deformation, such as extrusion, squeezing, drawing, upsetting, etc., a comparable relationship exists. The rolling introduces stresses which tend to open up this nucleal bond, as follows:

In a rolling operation, even of a single sheet of metal, the top portion of the metal being rolled has a tendency on the exit side to curl up, and similarly the lower portion of the rolled metal tends to curl down. This tendency is well known in the art and often designated as "alligatoring." The nucleal bond as formed by the deformation and pressure must be sufficiently strong to prevent its destruction by this alligatoring force. It must also be strong enough to permit handling of the strip.

Sufficient strength of the nucleal bond can be obtained by judiciously selecting in accordance with the instructions hereof the reduction in the thickness of the strip in relation to the diameter of the rolls, the thickness of the strip prior to rolling and the work-hardening characteristics of the metals involved. Other factors are the presence of front and rear strip tension and the degree of lubrication between the roll and strip surface.

In general, the greater the thickness of the component metals and the greater their work-hardening tendency, the greater is the amount of reduction required to form a sufficiently strong nucleal bond to overcome the alligatoring tendency. On the other hand, the better the lubrication and the greater the tension on the strip the smaller the reduction required to counteract this tendency. In other methods of obtaining the deformation the separating forces may be greater or smaller, depending on the particular means used and the products desired. In such cases analogous considerations govern.

Figure 8:
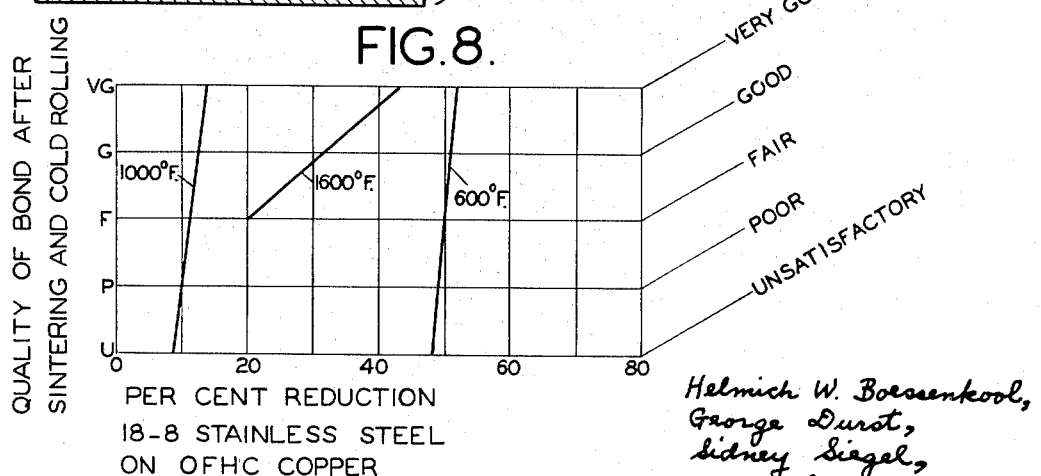
Fig. 8 is a chart on which we have plotted curves illustrating the relation of quality of bond to percentage of reduction for different temperatures.

Fig. 8 is a chart which shows for a selected combination of metals (in this instance 18–8 stainless steel and OFHC copper) and for a series of bonding temperatures the relationship between percentage of reduction in the deformation step and bond quality measured after sintering and cold reduction, as will be explained in more detail later. It will be seen that the ordinates of this chart represent quality of bond, and the abscissae represent percent reduction. We have specified qualities of bond as Unsatisfactory, Poor, Fair, Good and Very Good. In practice, the quality of the bond for purposes of charting is determined by clamping bonded material in a vise and manually pulling one strip away from the other, using a pair of pliers. (In order to facilitate the test the strips are prevented from bonding at their ends as by using a parting compound between the end portions of the strips.) If the strips come apart simply by handling, the bond is "Unsatisfactory." If the strips come apart upon exertion of very little force, the bond is "Poor." If they peel apart under moderate force, the bond is "Fair." If there is considerable difficulty in manually peeling the strips apart, the bond is "Good." If the strips cannot be pulled apart, or only with very considerable difficulty, involving tearing of one of the metals, indicating that the bond is as strong as one of the metals itself, the bond is "Very Good."

A test to determine the minimum reduction at any given deformation temperature necessary to form a good bond is now described. For a selected combination of metals and for a given bonding temperature the data for a chart like Fig. 8 is obtained as follows: We clean the faces of two test strips of metals very thoroughly. Then the metals are superimposed and spotwelded or otherwise fastened together at one end. The strips of metal are then inserted into a tube through which a reducing atmosphere, such as dissociated ammonia, can be flushed. The tube holding the strips is then placed in a controlled-temperature furnace and heated to the test temperature. After the sample has reached this temperature, the tube with the gas still being flushed therethrough is quickly brought over to the rolls of a rolling mill. The metal sample projects from the tube sufficiently so that it can be inserted into the pinch of the rolls and thus pulled out of the tube into the rolls, which have been adjusted to impart a predetermined reduction. Jets of protective atmosphere are directed against the sides of the strips during the time that they issue from the tube and enter into the rolls, so that oxidation of the edges does not take place. After the specimen has been thus nucleal-bonded, it is sintered by heating preferably in a controlled-temperature furnace for a time long enough to recrystallize at least the metal having the lowest recrystallization temperature. Following the sintering operation, the specimen is cold rolled by conventional rolling methods down to approximately 50% of its as-bonded original thickness. The specimen is cold rolled in order that the material as tested will be approximately in the condition to which the commercial end product may be subjected. After the specimen has been rolled, the bond quality test described above is made, involving pulling apart the component strips. In this way, we test a number of specimens all bonded at the same temperature, with increasing percentages of reduction, each test supplying data for plotting one point. For example, referring to Fig. 8 it will be seen that if stainless steel and OFHC copper are heated to 600° F. before bonding and are rolled with 51% reduction in one pass, the bond after subsequent sintering and cold rolling is good; while at the same temperature and 48% reduction the bond is unsatisfactory. Likewise, when the bonding temperature is 1000° F., 13% reduction is required to result subsequently in a good bond, and at 1600° F., 30% reduction is required.

We make curves such as illustrated in Fig. 8 for a selected series of elevated temperatures giving the quality of bond at that reduction within the range from just above the minimum recrystallization temperature of the metal having the lowest recrystallization temperature, up to either the hot-short temperature or highest temperature permissible without formation of brittle compounds or liquid phase material.

After obtaining the data plotted on charts such as Fig. 8 for a given combination of metals, we can determine the point on each curve where it intersects the ordinate marked "good." The coordinates of this point represent the combination of bonding temperature and minimum percent reduction at which, for the given combination of metals, a good bond will result after subsequent processing, that is, a bond which is commercially satisfactory in the sense that the composite stock will withstand fabrication and service without separation of the layers.

By plotting these combinations of bonding temperature and minimum percent reduction, we obtain what may be termed "characteristic bonding curves" for this given combination.

Figure 9:
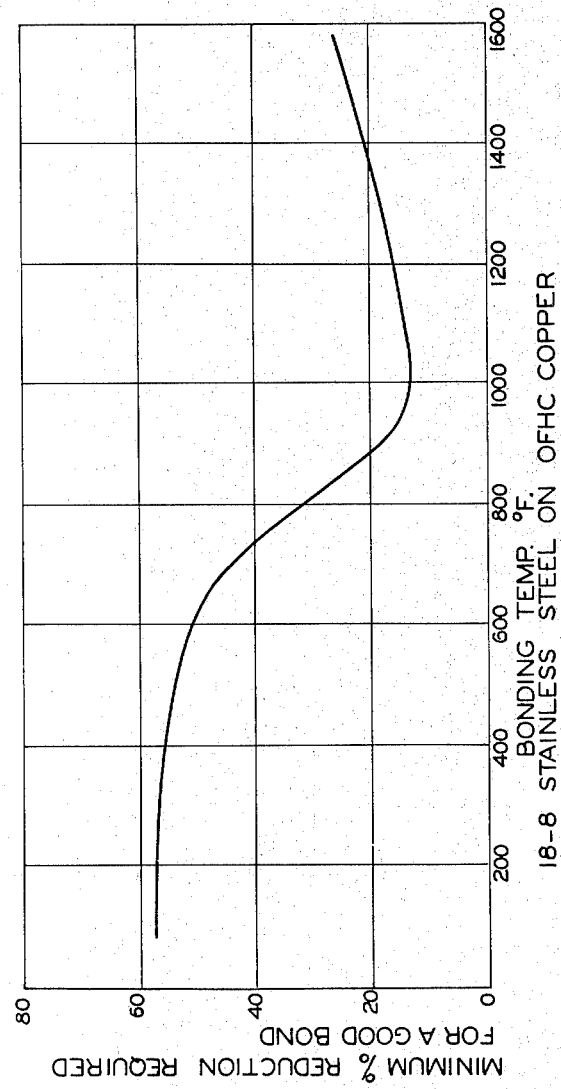

Fig. 9 represents the characteristic bonding curve for 18—8 stainless steel on O. F. H. C. copper. The ordinates represent the minimum percentage of reduction in a single pass required to result in a bond which after sintering and 50% cold reduction proves to be good. The abscissae represent bonding temperature (the approximate temperature of the metals as they enter the rolls of the rolling mill) in the degrees Fahrenheit. It is obvious that the characteristic bonding curves indicate approximately the lowest percentage of reduction that may be used in conjunction with a particular temperature to obtain in hot rolling in one pass, a nucleal bond which, after sintering, proves to have been extended into a continuous commercially satisfactory bond.

The above combination of stainless steel on copper was chosen, not only to show how a characteristic bonding curve is derived from a Fig. 8 chart, but also to illustrate one of the unexpected results of our invention. An examination of the curve shows that such a combination may be bonded, following the steps of our process, at a reduction of approximately 13% at a temperature of 1000° F. If the temperature is greater or less than this, the percent of reduction must be increased. This is contrary to what has hitherto been assumed by prior investigators, and is contrary to normal metallurgical reasoning. It might be assumed that if one needed a given percent reduction at one temperature, then at a higher temperature less reduction would be needed. This is true only up to 1000° F. for the copper on stainless steel. Beyond this point the reduction required increases with increase in temperature, and this fact alone probably explains the unsatisfactory attempts of earlier investigators to bond these two metals together in a solid phase bonding process of a continuous nature. We emphasize that this same phenomenon is present in many other combinations of metals but not in all, and we refer to the temperature where the percent reduction is the lowest as the minimal reduction temperature.

We believe that the existence of a minimal reduction temperature is caused by the interaction of various factors that govern the number and size of the nucleal bonds. Of these factors, two very important ones are the compressive strengths of the metals, which govern the stresses during deformation for a given percent reduction, and the atomic mobility (rate of diffusion) under the temperature and working conditions of bonding. While the decrease of compressive strength with rising temperature will reduce the number and/or size of nucleal bonds, the increase of atomic mobility will increase their number and/or size. Both these functions, perhaps influenced by solid phase changes, recrystallization transformation, etc., produce in combination what we have described as characteristic bonding curve.

From a practical viewpoint, the minimal point bonding allows many metals to be bonded on conventional equipment which could otherwise be bonded only on very heavy equipment capable of imparting very high reductions. Hitherto, workers in the art who have attempted to solid phase bond copper and stainless steel have not realized that a reduction of only 13% at 1000° F. is required, a reduction that is possible with conventional equipment, and have all attempted to accomplish their bonding at a temperature as close to the melting point of the copper as possible.

Figure 10:
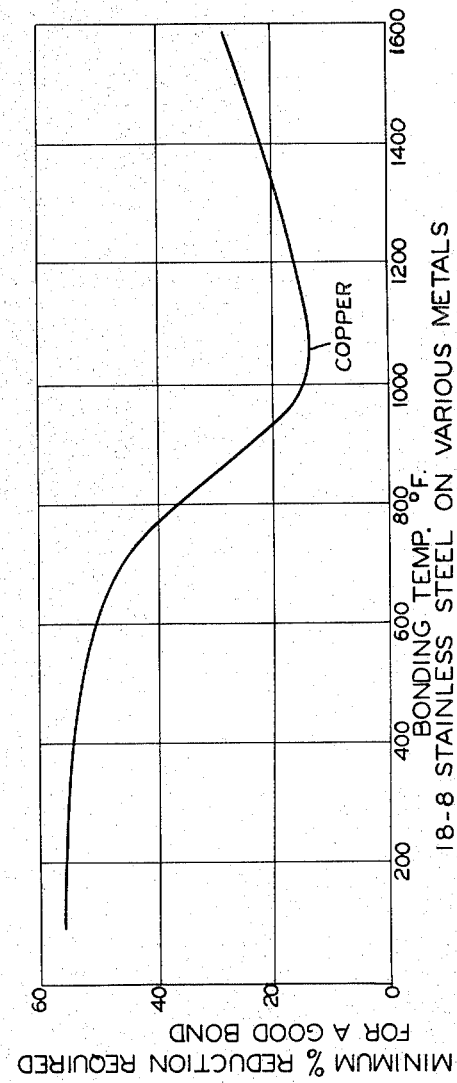

Figs. 10–22 show characteristic bonding curves for other combinations of metals. In presenting these charts, for practical working considerations, we have grouped in any given chart the curves for a given one metal combined with other metals. Thus, if one wishes to determine the minimum percent reduction necessary at any given temperature to bond coin silver to another metal, he turns to the chart for coin silver (Fig. 11 in this application) and finds there the curve for the particular metal desired. Thus:

Fig. 10 illustrates the characteristic bonding curves for 18—8 stainless steel on other metals.

Figures 11, 12:
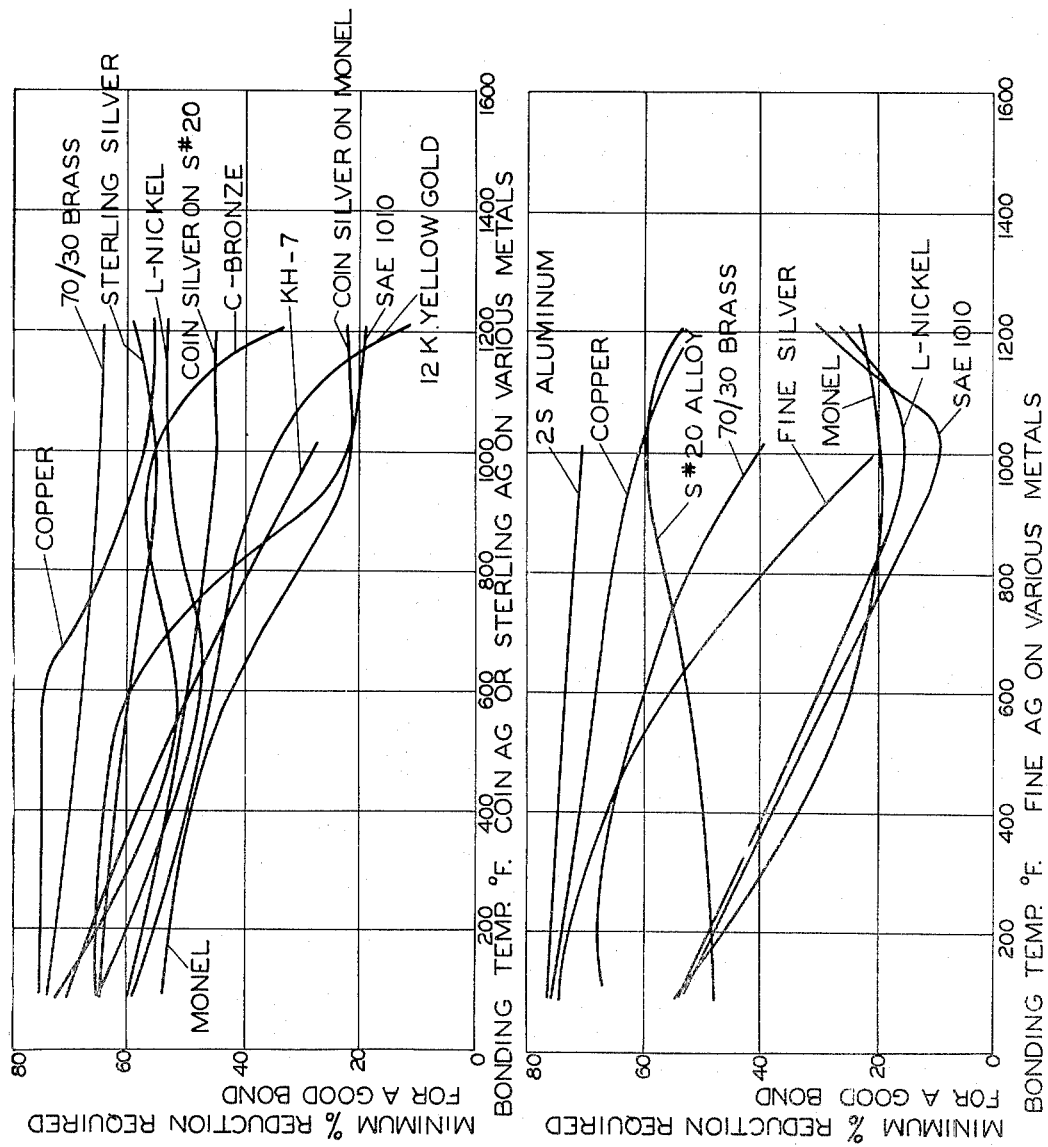

Fig. 11 illustrates the characteristic bonding curves for coin (or sterling) silver and other metals.

Fig. 12 illustrates the characteristic bonding curve for fine silver and other metals.

Figure 13:
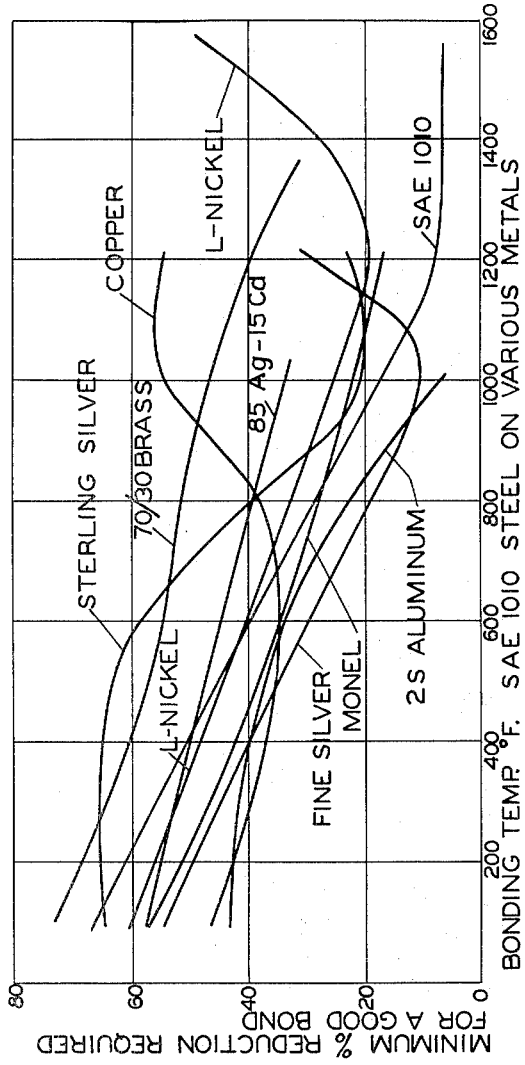
Figure 14:
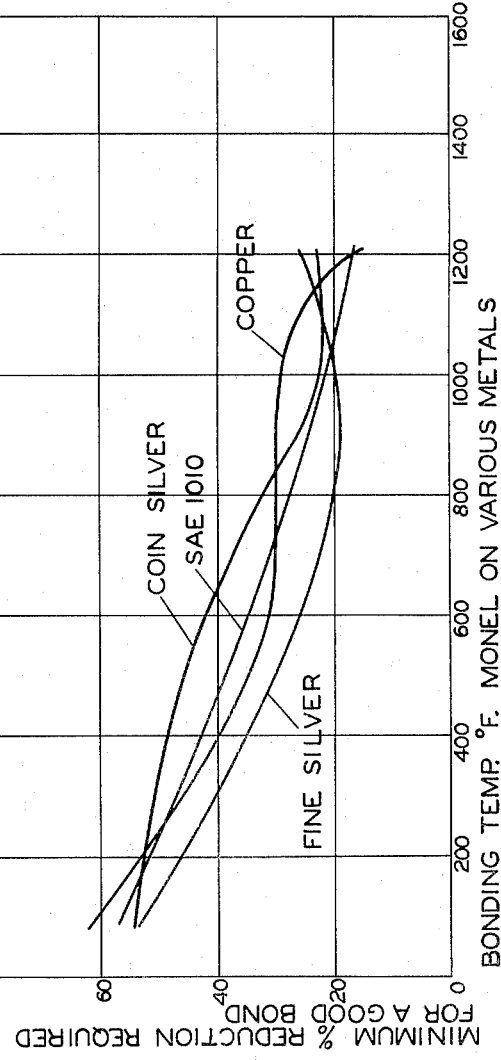
Figure 15:
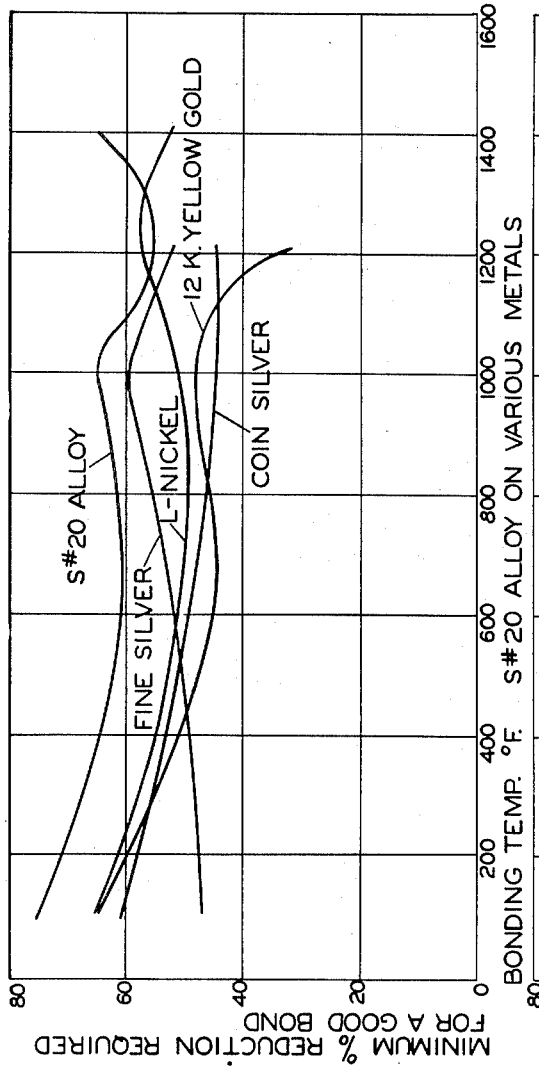
Figure 16:
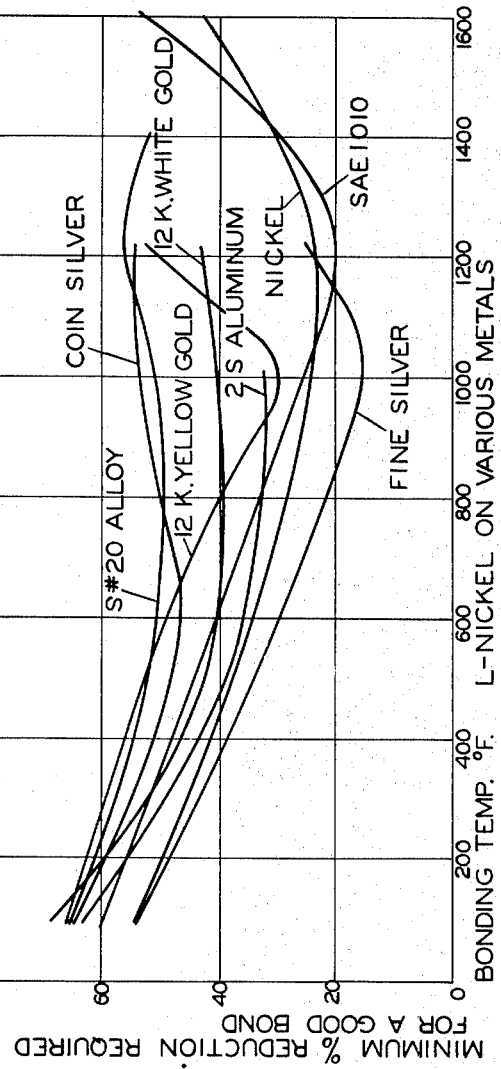
Figure 17:
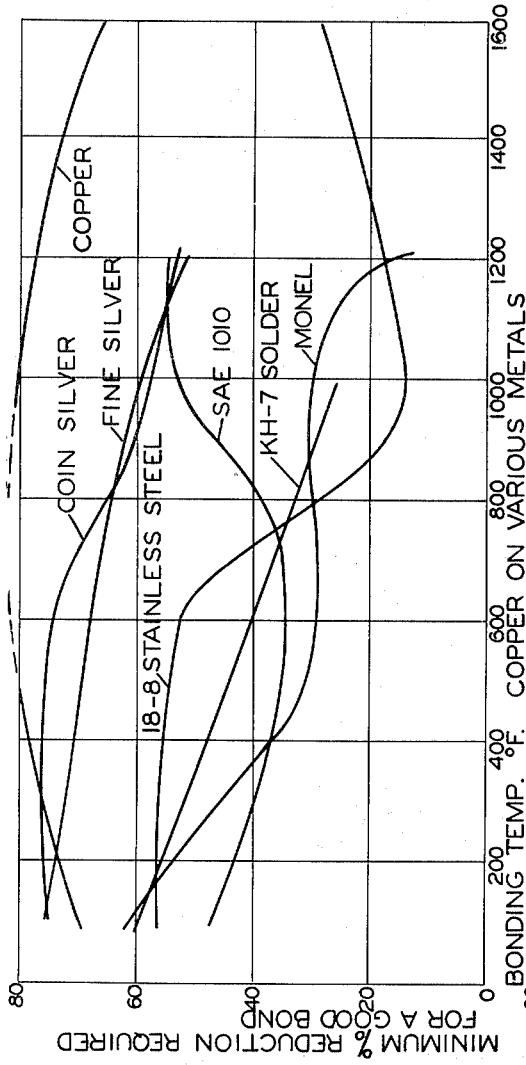
Figure 18:
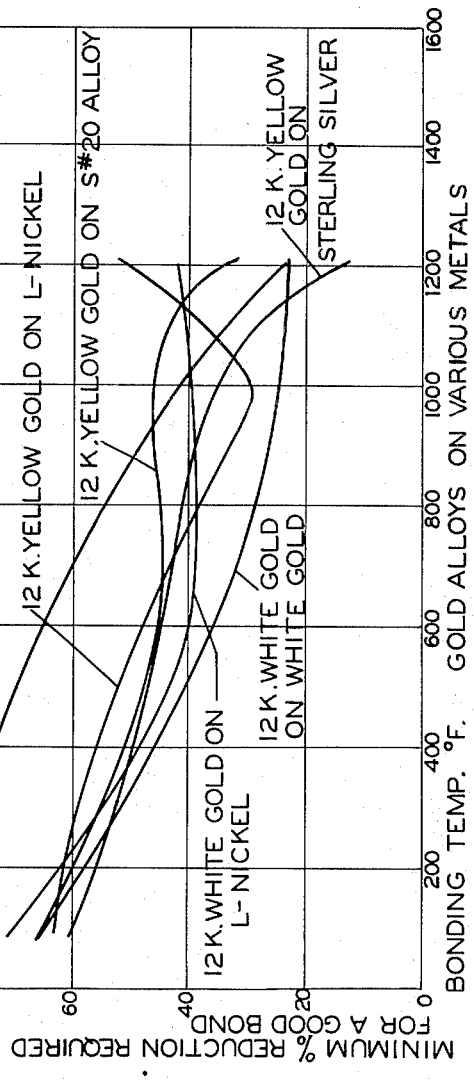
Figure 19:
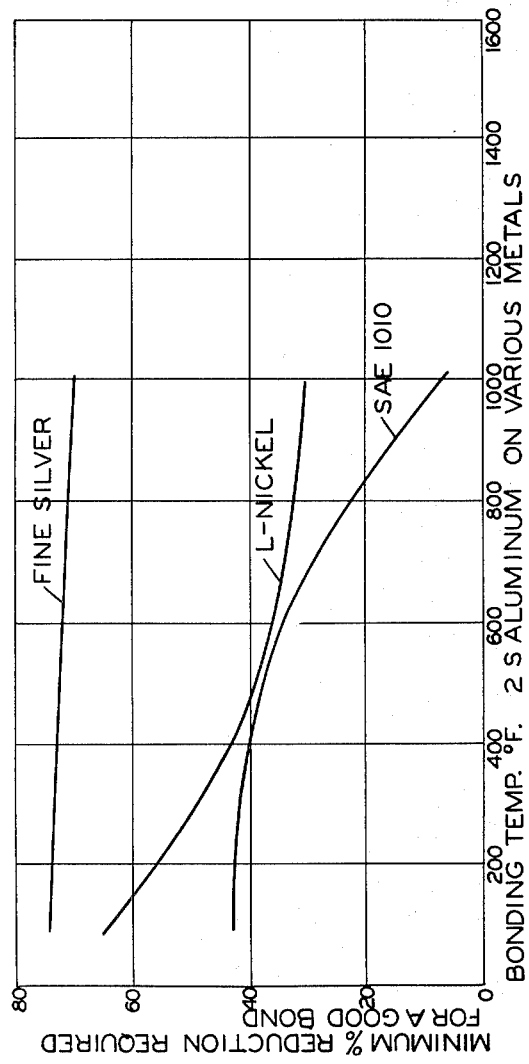
Figure 20:
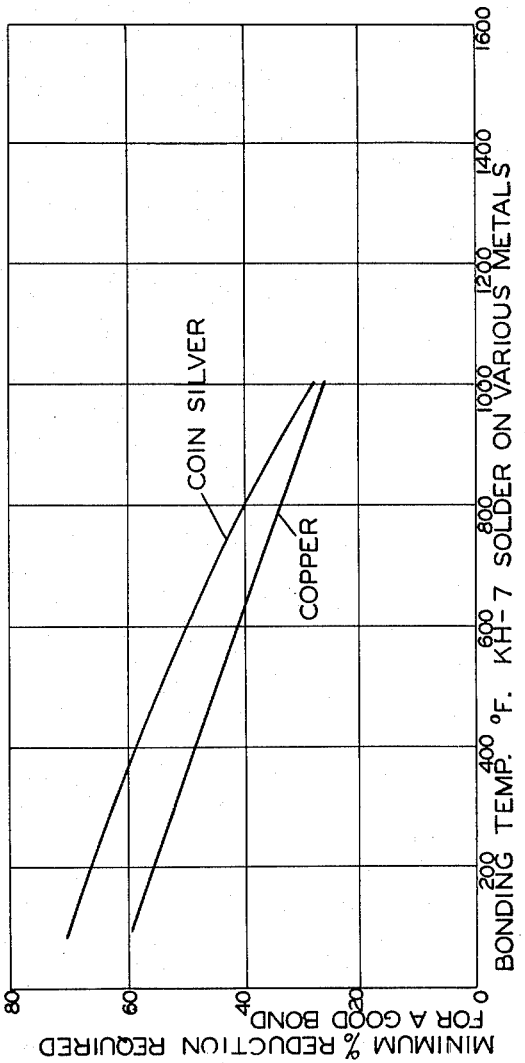

Fig. 13 illustrates the characteristic bonding curve for SAE 1010 steel and other metals.

Fig. 22 illustrates the characteristic bonding curves for various metals to themselves.

It will be noted that the various characteristic bonding curves have been plotted from room temperature up, but it is to be emphasized that we are concerned here only with that portion of each curve (as to a given combination of metals) which start from the minimum recrystallization temperature of the metal having the lowest recrystallization temperature.

It will be seen that to join L-nickel (Fig. 22) with a final good bond, involving first hot rolling in one pass for nucleal-bonding, and second, sintering, the hot rolling could be accomplished for example at 1200° F. with a minimum percentage of reduction of about 22% and at 1600° F. with a minimum percentage of reduction of about 40%.

Referring again to the unexpected results of our invention, it is to be noticed that in this example, the minimal reduction point comes at about 1350° F. with a reduction of 20%. At a higher temperature (for example, the above mentioned 1600° F.) the percent reduction increases rather than decreases, a phenomenon which goes just the opposite to what is known or taught today in the metallurgical field. Having the characteristic curve, the necessary minimum percentage of reduction for other temperatures is easily determined.

Details of the test specimens on which the curves shown in Figs. 9–22 are based are tabulated below, all the strips being 1⅜ inches wide, and rolled in a mill having work rolls 5 inches in diameter:

| 1st Metal | Thickness, inches | 2nd Metal | Thickness, inches | Curve Shown in Fig.— | Sintering Temperature, Degrees F. |
|---|---|---|---|---|---|
| S. #20 | 0.060 | S. #20 | .060 | 15 and 22 | 1,250 |
| S. #20 | .060 | L-Nickel | .060 | 15 and 16 | 1,250 |
| 15% Nickel Silver | .060 | 15% Nickel Silver | .060 | 22 | 1,250 |
| Coin Silver | .045 | S. #20 | .060 | 11 and 15 | 1,200 |
| Do | .045 | L-Nickel | .060 | 11 and 16 | 1,200 |
| Fine Silver | .057 | do | .060 | 12 and 16 | 1,200 |
| Do | .057 | SAE 1010 Steel | .082 | 12 and 13 | 1,200 |
| Sterling Silver | .060 | do | .082 | 11 and 13 | 1,200 |
| Do | .060 | Sterling Silver | .060 | 22 and 11 | 1,200 |
| Copper | .060 | Fine Silver | .057 | 12 and 17 | 1,200 |
| Monel | .060 | Coin Silver | .045 | 11 and 14 | 1,200 |
| Do | .060 | Copper | .060 | 14 and 17 | 1,600 |
| Do | .060 | Fine Silver | .057 | 12 and 14 | 1,200 |
| 12K Yellow Gold | .032 | S. #20 | .060 | 15 and 18 | 1,200 |
| Fine Silver | .055 | Fine Silver | .055 | 22 and 12 | 1,200 |
| 12K White Gold | .026 | 12K White Gold | .026 | 22 and 18 | 1,200 |
| 2S Aluminum | .122 | Fine Silver | .057 | 12 and 19 | 650 |
| Do | .122 | SAE 1010 Steel | .078 | 13 and 19 | 650 |
| Copper | .045 | do | .078 | 13 and 17 | 1,250 |
| KH-7 Silver Solder | .053 | Copper | .046 | 17 and 20 | 1,000 |
| 12K Yellow Gold | .032 | Sterling Silver | .060 | 11 and 18 | 1,200 |
| Coin Silver | .045 | C-Bronze | .091 | 11 | 1,200 |
| Fine Silver | .057 | S. #20 | .060 | 12 and 15 | 1,200 |
| Copper | .060 | Coin Silver | .045 | 11 and 17 | 1,200 |
| Do | .080 | Copper | .080 | 17 and 22 | 1,000 |
| Invar | .072 | Invar | .072 | 22 | 1,400 |
| L-Nickel | .055 | L-Nickel | .055 | 16 and 22 | 1,400 |
| Alloy B | .072 | Alloy B | .072 | 22 | 1,400 |
| SAE 1010 Steel | .078 | SAE 1010 Steel | .078 | 13 and 22 | 1,400 |
| L-Nickel | .055 | do | .078 | 13 and 16 | 1,400 |
| 70-30 Brass | .060 | Coin Silver | .060 | 11 | 1,200 |
| KH-7 Silver Solder | .050 | do | .060 | 11 and 20 | 1,000 |
| 70-30 Brass | .060 | Fine Silver | .060 | 12 | 1,200 |
| 12K Yellow Gold | .046 | L-Nickel | .060 | 16 and 18 | 1,200 |
| 12K White Gold | .026 | do | .060 | 16 and 18 | 1,200 |
| 2S Aluminum | .121 | do | .060 | 16 and 19 | 650 |
| Copper | .066 | 18-8 Stainless Steel | .060 | 9, 10, and 17 | 1,700 |
| 12K Yellow Gold | .032 | 15% Nickel Silver | .060 | 18 | 1,200 |
| Alloy B | .072 | Invar | .072 | 21 | 1,400 |
| 70-30 Brass | .060 | SAE 1010 Steel | .066 | 13 | 1,250 |
| 85 Silver 15 Cadmium | .060 | do | .068 | 13 | 1,200 |
| Alloy P | .037 | Alloy 10 | .060 | 21 | [1] 1,700 |
| 2S Aluminum | .121 | 2S Aluminum | .121 | 19 | 650 |
| Do | .121 | 18-8 Stainless | .060 | 10 and 19 | 1,000 |
| 18-8 Stainless Steel | .060 | SAE 1010 Steel | .068 | 10 | 1,850 |

[1] Alloy P to Invar was sintered immediately after bonding and before the metal cooled.

S. #20 is an alloy consisting of 92% copper, 7% zinc, and 1% tin.

L-nickel is commercially pure nickel with a maximum of 0.01% carbon.

2S aluminum is the commercial designation for commercially pure aluminum.

KH-7 silver solder is a 50% silver solder containing zinc and cadmium (50% silver, 15.5% copper, 16.5% zinc, 18% cadmium).

C-bronze is an alloy containing 92% copper and 8% tin.

Alloy B is a chrome-iron alloy consisting of 22% nickel, 3.15% chromium, 0.15% carbon, 0.35–0.50% manganese, balance iron.

O. F. H. C. refers to oxygen free, high conductivity copper. Wherever we refer to copper we mean O. F. H. C. copper.

Alloy P consists of 72% manganese, 18% copper and 10% nickel.

From the above, it will be clear how for any combination of metals we can determine the correlation between temperature and percentage of reduction necessary to obtain a suitable nucleal bond, that is, one which can be sintered into a good bond. For any given combination of metals the first step is to test the quality of bond obtained for different percentages of reduction at one temperature, and plot a quality of bond vs. percentage of reduction curve like that shown in Fig. 8 for that temperature. Then, data is determined and other curves are plotted for other test temperatures. In practice, such curves may be plotted for whatever temperature intervals may be desired. Having a set of such curves for the given combination of metals, the characteristic bonding curve (minimum percentage of reduction needed to obtain a good bond vs. bonding temperature), like those shown in Figs. 9–22, is plotted. Having the characteristic bonding curve for any particular combination of metals, we can select temperature and corresponding minimum percent reduction necessary for bonding. In general, it may be said that any correlation of temperature and percent reduction may be selected as long as it is taken from the area on the chart above the characteristic bonding curve, noting that values in the area below the curve generally will not lead to good bonding by the procedure specified. The preferred selection of bonding temperature and corresponding minimum percent reduction depends mostly on the equipment and dimensions of materials available.

Here it must be emphasized that the data used in the characteristic bonding curves result from tests in which the material was cold worked 50% after sintering, and that corresponding data for the bond strength plotted for test specimens before any cold working may differ slightly from the values given. However, this difference may be readily ascertained by the technique described above, if such data are desired. It must also be emphasized that the thickness of the specimens used in determining the Fig. 8 chart influences to some extent the final characteristic bonding curves. This comes from the fact that for a given roll diameter, the parting forces (referred to above as stresses caused by rolling which tend to "alligator" the nucleal bond) are a function of the thickness of the material being rolled. Hence the thickness of the materials is a factor to be considered in using the characteristic bonding curves. In the above table, the thickness of the strips has been specified. Data for significantly different thickness can be obtained by the techniques described above.

Minimum characteristic bonding curves may also be determined by analogous test procedures in cases where the deformation means used are extrusion, or drawing, or upsetting means. In many of these cases, the parting forces do not exist to the extent they do in a rolling mill, and consequently the shape of the characteristic bonding curve will change.

The following examples illustrate the invention for continuous operations:

*Example 1*

We bonded fine silver to Monel as follows:

We used a continuous strip of fine silver 4 inches wide and 0.0182 inch thick and a continuous strip of Monel 4 inches wide by 0.090 inch thick. These were cleaned on their surfaces to be bonded by wire brushing to remove gross contaminants. The strips were then nucleal bonded in the manner illustrated in Fig. 1, being heated in the furnace in an atmosphere of dissociated ammonia with the furnace temperature controlled at 1200° F. The strips entering the rolls of the rolling mill were at about 900°–1000° F. The rolls were set for a reduction of about 32.5%, resulting in an overall thickness of 0.073 inch. It will be seen that this percentage of reduction was somewhat above the minimum for bonding at 900°–1000° dictated by the fine silver-Monel curve shown in Figs 12 or 14. The mill used was a two-high mill with 10 inch diameter rolls. The speed of the mill was controlled so that the speed of the nucleal-bonded two-layer strip issuing from the mill was about 12 feet per minute. The two-layer material issuing from the mill was wound into a tight coil, being adequately nucleal bonded so that its layers would not come apart under its handling in coil form, but still weak. Then the coiled, nucleal-bonded two-layer material was sintered in an ordinary furnace at 1300° F. The coil, weighing about 158 lbs., was sintered for about 100 minutes. The two-layer strip, resulting from this second operation, was strongly bonded.

*Example 2*

We bonded SAE 1010 steel to SAE 1010 steel as follows:

We used continuous strips of steel 4 inches wide and 0.078 inch thick. These were cleaned on their surfaces to be bonded to remove gross contaminants by abrasion, using a belt sander. The strips were then nucleal-bonded in the manner illustrated in Fig. 1, being heated in the furnace in an atmosphere of dissociated ammonia with the furnace temperature controlled at 1500° F. The strips entering the rolls of the rolling mill were at about 1100°–1200° F. The same mill as Example 1 was used, set for a reduction of about 20%, resulting in an overall thickness of approximately 0.125 inch. The speed was controlled so that the nucleal-bonded two-layer strip emerged from the mill at about 12 feet per minute. The two-layer strip was wound into a tight coil, weighing about 165 lbs., and sintered in a salt pot furnace at 1400° F. for about 45 minutes. The two-layer stock resulting from this second operation was strongly bonded.

*Example 3*

We bonded L-nickel to SAE 1010 steel as follows:

We used a continuous strip of L-nickel 4 inches wide and 0.010 inch thick and a continuous strip of the steel 4 inches wide and 0.079 inch thick. The nickel strip was cleaned on its bonding face by wire brushing and the steel strip was cleaned on its bonding face by abrading with a belt sander. The strips were nucleal-bonded in the manner illustrated in Fig. 1 being heated in the furnace in an atmosphere of cracked exothermic city gas with the furnace temperature controlled at 1800° F. The strips entering the rolls were at about 1400–1500° F. The same mill was used as in Examples 1 and 2, set for a reduction of about 46%, resulting in an overall thickness of 0.047 inch. The speed was controlled so that the nucleal-bonded two-layer strip emerged from the mill at about 12 feet per minute. The two-layer strip was wound into a tight coil, weighing about 40–50 pounds, and sintered in a roller hearth furnace at 1350° F. for about one hour. The two-layer stock, resulting from the second operation, was strongly bonded.

Example 4

A multi-layer metal was produced as follows:

The steel-nickel stock of Example 3 was reduced by cold rolling to 0.015 inch thick (still 4 inches wide) and this strip formed one of the components to be bonded. The second component was a strip of SAE 1010 steel 4 inches wide and 0.068 inch thick. The third component was a strip of fine silver 4 inches wide and 0.061 inch thick. The steel side of the steel-nickel strip was wire brushed, both sides of the SAE 1010 were abraded, and one side of the silver was wire brushed. The three strips were nucleal-bonded in the manner illustrated in Figure 1 except that three strips were fed simultaneously instead of two. The silver was bonded to the 0.068 steel, and the 0.068 steel to the steel side of the steel-nickel strip. The strips were heated in a furnace in an atmosphere of dissociated ammonia with the furnace temperature controlled at 1200° F. The strips entering the rolls were at about 900–1000° F. The same mill was used as in Examples 1 and 2, set for an overall reduction of 48%, resulting in an overall thickness of 0.075 inch. The speed was controlled so that the nucleal-bonded three layer strip emerged from the mill at about 12 feet per minute. There was considerably more reduction of the silver than of the steel-nickel or steel layer. The multi-layer strip was wound into a tight coil weighing about 50 pounds, and sintered in a roller hearth furnace at 1250° F. for about one hour. The multi-layer stock, resulting from this second operation, was strongly bonded.

In regard to the bonding of more than two layers of metal where one or more of the layers is considerably softer than other layers, care must be taken to provide the maximum reduction required by any two components which are to be adjacent in the multi-layer material, if all the layers are to be bonded in one pass.

An example will illustrate this: Suppose that one is going to bond steel onto steel onto silver, the steel being the harder and the silver very soft. Supposing it is also desired to bond these at a temperature of 1000° F., an examination of the curves on Figure 13 reveals that at this temperature steel bonds to steel with a 15% reduction; and steel bonds to fine silver at 8% reduction. Since the reduction required to bond steel to steel is higher than required for steel to fine silver, one would ordinarily assume that an overall reduction at 15% would suffice to bond also the steel to fine silver. However, the softness of the silver may be such that it is reduced considerably more than the steel and the steel to steel does not get the required reduction, with the result that on giving this overall reduction, it may be found that the silver has bonded satisfactorily to the steel, but the steel has not bonded satisfactorily to the contiguous layer of steel. In such a case, therefore, it is necessary to apply a large enough overall reduction to the three layers to make sure that the reduction of any two contiguous layers of the assembly is at least the minimum dictated by the respective characteristic bonding curve.

In cases where a metal is of such nature that it is difficult by presently known techniques to protect it from oxidation, examples of such metals being tantalum, titanium, zirconium, etc., and certain alloys of these metals, the present invention is applicable providing the elongation of the metals in rolling and the resultant increase in interfacial area causes pulling apart of the oxide, permitting contact of virgin metal surfaces. Also, if such metals can be protected from oxidation at elevated temperatures, they can be bonded by the method of the present invention, apart from any consideration of oxide separation. Or, these cases may in many instances be taken care of by coating the metal with another metal which acts as a preventative to oxidation during the heating for elevated temperature rolling.

In cases where the combination of metals is such that there is a tendency for appreciable formation of intermediate compounds at the interface, either during hot rolling or the sintering operation, the bond may be brittle. Here, where possible, the rolling temperature and the sintering temperature should be so selected as not to cause formation of such compounds. For example, in bonding aluminum and copper, temperatures below approximately 1050° F. for hot rolling and temperatures below approximately 700° F. for sintering should be used to prevent the formation of excessive intermetallic copper-aluminum compounds at the interface.

It will be understood that it may be desirable in some cases to have the two metals at different bonding temperatures, of which one may be, for example, at room temperature, the other being at the elevated temperature contemplated by this invention. In the event that one of the metals is below approximately 500° F., the additional surface preparation to remove barrier films (heretofore described) should be used. Such a case may arise when the resistance to deformation of the metals is so divergent as to interfere with maintaining the desired thickness ratio. In this case it may be desirable to heat the harder of the two metals higher. Also, this may cause the working characteristics of the two metals to be more alike. In such a case, the characteristic bonding curve is determined by methods analogous to those described above.

It will now be apparent that our invention has distinct improvements over the prior art, and has attendant advantages not hitherto realized. We believe the concept that an initial bond of true atomic nature may be first formed in a weak state by an elevated temperature deformation operation and then later changed into a strong bond by sintering, capable of withstanding commercial fabrication, is new in the art. That this has significant advantages is apparent when it is realized that such a process of forming a bond makes possible the continuous bonding of long lengths of material with conventional apparatus, especially where the minimal bonding temperatures of certain metals are utilized. We teach a bonding technique of universal applicability to all malleable metals whereby the amount of reduction required in the deformation step may be so low that (a) standard deforming means may be used, and (b) the overall thickness of the final material may be only several percent less than the initial overall thickness (for example, by bonding stainless steel on copper at the minimal temperature, the final thickness is 85% of the initial thickness). This also means that the final components are not excessively work-hardened, an extremely important advantage where one material cannot withstand the annealing temperature required by the other. Nowhere in the art is this taught. We are also able to bond continuous strips in atmosphere, instead of short lengths or ingots in packs, with all the attendant advantages inherent therein. We teach utilization of the quenching effect of the rolls to induce strain hardening, which, as we have shown, influences advantageously the formation of the initial bond.

In this application, for reasons of clarity, we have so far referred to the metals as being bonded substantially over their entire interfacial areas, without mentioning whether the metals were co-extensive in area. In the various examples given, the strips used were approximately of the same width, but it must not be assumed that the materials being bonded must of necessity be of equal width. Using the characteristic bonding curves shown, our method is applicable for bonding strips of unequal width, for example, a narrow strip of silver onto a wider strip of base metal (for instance, copper) where it is desired to make material for electrical contact.

In view of the above, it will be seen that the several objects of the invention are achieved and other advantageous results attained.

As many changes could be made in the above methods without departing from the scope of the invention, it is intended that all matter contained in the above description or shown in the accompanying drawings shall be interpreted as illustrative and not in a limiting sense.

We claim:

1. The method of solid phase bonding malleable metals which have gross contaminants removed from those of their interfacial surfaces which are to be bonded in accordance with the characteristic solid phase bonding curve which expresses the minimum squeezing deformations required at various temperatures of at least one of the metals as the metals enter the squeezing step to accomplish a partial bonding of the metals by the formation of a multitude of discrete bonds with the integrated bond strength of said discrete bonds more than sufficient to hold the components together during subsequent handling operations but being capable of growth by a subsequent sintering operation substantially to increase the over-all bond strength; comprising the steps of initially heating at least one of the metals under non-oxidizing conditions to a temperature lying within the range which extends from the recrystallization temperature of said one metal up to the hot-short temperature of the metal or the temperature at which interfacial liquid phase material or a brittle intermetallic compound would form in appreciable amount, whichever is the lower, as the case may be, squeezing the metals together with said one metal substantially at said temperature as the metals enter the squeezing step and concurrently effecting an increase in area thereof with a deformation having as its lower limit the minimum deformation for the temperature of heating as determined from said characteristic bonding curve but sufficient only to form a fraction of a complete bond, thereby to form said discrete bonds, and thereafter sintering the metals held together by said discrete bonds at a temperature lying within the range which extends from approximately the recrystallization temperature of the metal having the lowest recrystallization temperature to one of those temperatures, whichever is the lower, as the case may be, at which liquid phase material or a brittle intermetallic compound would form in appreciable amount, said sintering being continued for such a time as to effect growth of the bonds, thereby substantially to increase the over-all bond strength, the method including a heating operation applied to said interfacial surfaces to eliminate films which would otherwise act as a barrier to bonding, said operation being performed either by said initial heating provided the heating occurs at a temperature adapted to eliminate such films or by an additional preliminary heating of said interfacial surfaces at a sufficient temperature to eliminate the films, as the case may require.

2. The method of solid phase bonding malleable metals which have gross contaminants removed from those of their interfacial surfaces which are to be bonded in accordance with the characteristic solid phase bonding curve which expresses the minimum squeezing deformations required at various temperatures of at least one of the metals as they enter the squeezing step to accomplish a partial bonding of the metals by the formation of a multitude of discrete bonds with the integrated bond strength of said discrete bonds more than sufficient to hold the components together during subsequent handling operations but being capable of growth by a subsequent sintering operation substantially to increase the over-all bond strength; comprising the steps of preliminarily heating said interfacial surfaces to remove bond deterrent films, heating at least one of the metals under nonoxidizing conditions to a temperature lying within the range which extends from the recrystallization temperature of said one metal up to the hot-short temperature of the metal or the temperature at which interfacial liquid phase material or a brittle intermetallic compound would form in appreciable amount, whichever is the lower, as the case may be, squeezing the metals together with said one metal substantially at said temperature as the metals enter the squeezing step, said squeezing being effected by squeezing means which are lower in temperature than the temperature of said one metal to strain harden at least one of said metals, and concurrently effecting an increase in area thereof with a deformation having as its lower limit the minimum deformation for the temperature of heating as determined from said characteristic bonding curve for the metals but sufficient only to form a fraction of a complete bond, thereby to form said discrete bonds, and thereafter sintering the metals held together by said discrete bonds at a temperature lying within the range which extends from approximately the recrystallization temperature of the metal having the lowest recrystallization temperature to one of those temperatures, whichever is the lower, as the case may be, at which liquid phase material or a brittle intermetallic compound would form in appreciable amount, said sintering being continued for such a time as to effect growth of the bonds, thereby substantially to increase the over-all bond strength.

3. The method of solid phase bonding malleable metals which have gross contaminants removed from those of their interfacial surfaces which are to be bonded in accordance with the characteristic solid phase bonding curve which expresses the minimum squeezing deformations required at various temperatures of the metals to accomplish bonding of the metals by the formation of a multitude of discrete bonds with the integrated bond strength of said discrete bonds forming a fraction of the complete bond strength but being capable of growth by a subsequent sintering operation to develop substantially full bond strength; comprising the steps of heating the metals under nonoxidizing conditions to a temperature lying within the range which extends from the recrystallization temperature of the metal having the lowest recrystallization temperature up to the hot-short temperature of the metal having the lowest hot-short temperature or the temperature at which interfacial liquid phase material or a brittle intermetallic compound would form in appreciable amount, whichever is the lower, as the case may be, squeezing the metals together with said metals substantially at said temperature as they enter the squeezing step and concurrently effecting an increase in area thereof with a deformation having as its lower limit the minimum deformation for the temperature of heating as determined from said characteristic bonding curve but sufficient only to form a fraction of a complete bond, thereby to form said discrete bonds, and thereafter sintering the metals held together by said discrete bonds at a temperature lying within the range which extends from approximately the recrystallization temperature of the metal having the lowest recrystallization temperature to one of those temperatures, whichever is the lower, as the case may be, at which liquid phase material or a brittle intermetallic compound would form in appreciable amount, said sintering being continued for such a time as to effect growth of the bonds so as to develop the initial incomplete bond into a substantially complete bond, the method including heat treatment of said interfacial surfaces either by said initial heating and/or a preliminary heating of said interfacial surfaces at a temperature adapted to eliminate films which would otherwise act as barriers to bonding.

4. The method of solid phase bonding malleable metals which have gross contaminants removed from those of their interfacial surfaces which are to be interfacially bonded in accordance with the characteristic solid phase bonding curve which expresses the minimum squeezing deformations required at various temperatures of the metals to accomplish a partial bonding of the metals by the formation of a multitude of discrete bonds with the integrated bond strength of said discrete bonds forming a fraction of the complete bond strength but being capable of growth by a subsequent sintering operation to develop substantially full bond strength; comprising the steps of preliminarily heating the interfaces of the metals to eliminate films which would otherwise act as barriers to bonding, heating at least one of the metals under nonoxidizing conditions to a temperature lying within the range which extends from the recrystallization temperature of said one metal up to the hot-short temperature of the metal or the temperature at which interfacial liquid phase material or a brittle intermetallic compound would form in appreciable amount, whichever is the lower, as the case may be, squeezing the metals together with said one metal substantially at said temperature as the metals enter the squeezing step; and concurrently effecting an increase in area thereof with a deformation having as its lower limit the minimum deformation for the temperature of heating as determined from said characteristic bonding curve but sufficient only to form a fraction of a complete bond, thereby to form said discrete bonds, and thereafter sintering the metals held together by said discrete bonds at a temperature lying within the range which extends from approximately the recrystallization temperature of the metal having the lowest recrystallization temperature to one of those temperatures, whichever is the lower, as the case may be, at which liquid phase material or a brittle intermetallic compound would form in appreciable amount, said sintering being continued for such a time as to effect growth of the bonds, thereby to develop the initial incomplete bond into a substantially complete bond.

5. The method according to claim 4, wherein said preliminary heating step comprises scratch brushing with an energy input sufficient to cause a surface temperature rise which will eliminate residual hydrated and/or organic films.

6. The method of solid phase bonding of malleable metals according to claim 1, wherein the squeezing step is accomplished by rolling.

References Cited in the file of this patent

UNITED STATES PATENTS

| | | |
|---|---|---|
| 1,043,576 | Eldred | Nov. 5, 1912 |
| 1,130,077 | Eldred | Mar. 2, 1915 |
| 1,667,787 | Jaeger | May 1, 1928 |
| 2,414,511 | Dyar | Jan. 21, 1947 |
| 2,438,759 | Liebowitz | Mar. 30, 1948 |
| 2,484,118 | Reynolds | Oct. 11, 1949 |
| 2,522,408 | Sowter | Sept. 12, 1950 |
| 2,539,246 | Hensel | Jan. 23, 1951 |
| 2,558,093 | Kinney | June 26, 1951 |
| 2,691,815 | Boessenkool | Oct. 19, 1954 |

OTHER REFERENCES

Welding Metallurgy, page 341, by O. H. Henry et al., vol. I and II, 1940, American Welding Society.

Solid Phase Welding, Adam Lecture A. B. Kinzel, published Welding Journal, Dec. 1944, pages 1124–1145.

Tylecote, R. F.: Pressure Welding of Light Alloys Without Fusion, published Transactions of the Institute of Welding, Nov. 1945, pages 163–178.

Observations on Solid Phase Bonding, George Durst, Jan. 1947, pages 97–101, Metal Progress.

Cady, E. L.: When Metal Atoms Wander, published Scientific American, July 1947, pages 15–17.

Material Joined by New Cold Welding Process, by A. B. Sowter, Feb. 1949, Welding Journal, pages 149–152.

Kelley, F. C.: Pressure Welding, published Welding Journal, Aug. 1951, pages 728–736.